Nov. 26, 1940.                W. L. MILLER                2,222,780
                    CONTROL DEVICE FOR PRIME MOVERS
                         Filed July 25, 1938
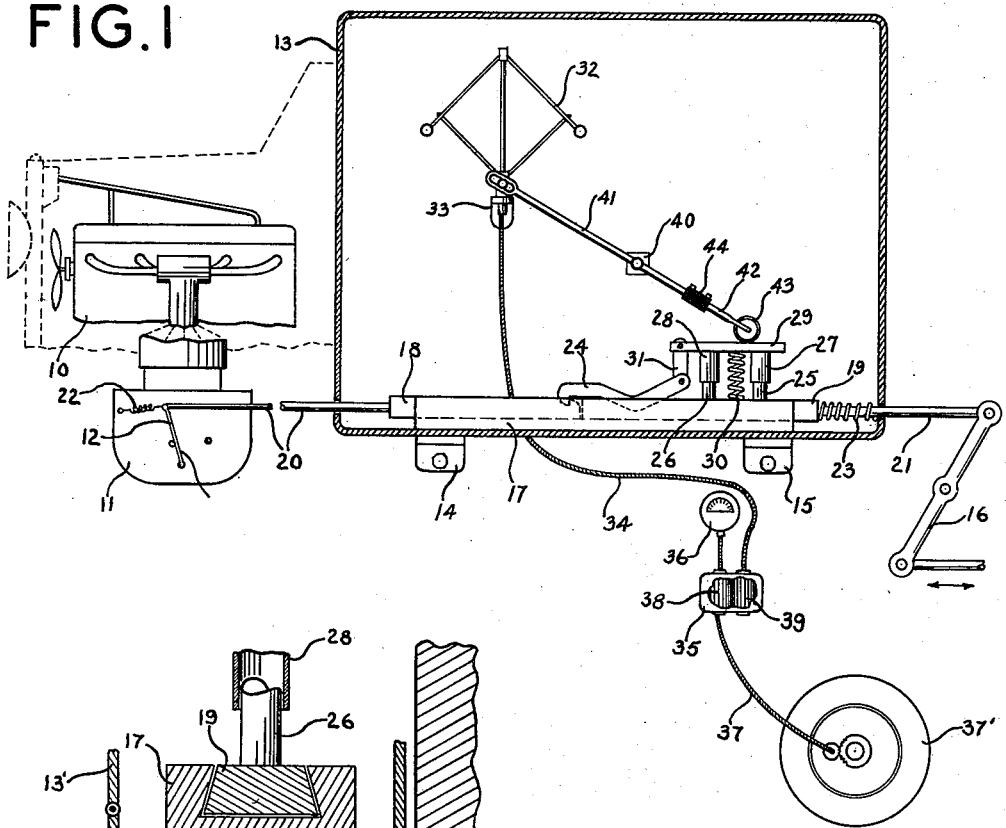
FIG.1
FIG.3
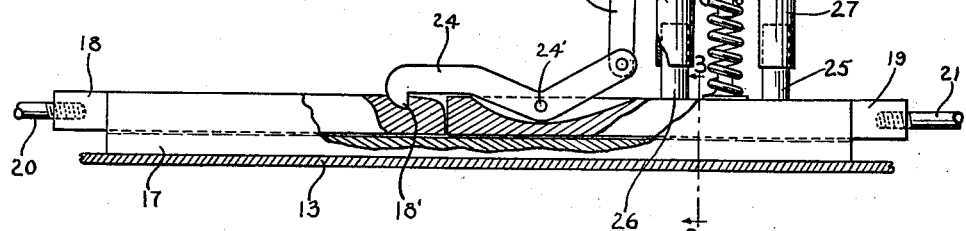
FIG.2
INVENTOR
WILSON L. MILLER.
BY
William A. Zalesak
ATTORNEY Patented Nov. 26, 1940

2,222,780

UNITED STATES PATENT OFFICE 2,222,780

CONTROL DEVICE FOR PRIME MOVERS

Wilson L. Miller, Rahway, N. J.

Application July 25, 1938, Serial No. 221,141

6 Claims. (Cl. 180—82.1)

My invention relates to prime movers for vehicles and controls therefor, particularly to speed limiting devices.

Speed limiting devices for prime movers for vehicles such as automobiles and the like usually control the fuel feeding device or carbureter directly in accordance with the speed of the engine by means of a simple form of governor which limits the amount of fuel which can be fed to the prime mover regardless of the speed of movement of the vehicle being driven. Such controls which limit the top speed of the prime mover interfere with the usual and efficient operation of the prime mover or motor at low vehicle speeds and high engine speeds such as on starting. The usual arrangement is fixed for one speed and requires more or less elaborate adjustments before it can be readjusted for another or higher or lower speeds. Furthermore such arrangements can usually easily be tampered with.

Hence one of the principal objects of my invention is to provide a control device for prime movers for vehicles which can be used to limit speed of travel of the vehicle and which at the same time does not interfere with the normal operation of the prime mover for all speeds of the vehicle below the predetermined maximum speed of the vehicle.

Another object of my invention is to provide such a device which is simple in construction, positive in operation and which cannot be easily tampered with.

Another object of my invention is to provide such a speed control device which can be readily adjusted for different predetermined maximum speeds of the vehicle. It is a further object to provide such a device which is easily adapted to existing prime movers.

Again in connection with prime movers for propelling watercraft and the like through water, in particularly rough weather, when the stern of the boat is lifted out of the water the load is suddenly removed from the propeller shaft which permits the prime mover to race and the propeller to reach particularly high speeds. Upon the sudden submersion of the propeller when the stern settles into the water, the sudden load applied to the shaft may cause the shaft to be broken. Usually the pilot or engineer must watch this action and manually reduce the speed of the motor to prevent this overloading.

Hence it is another object of my invention to provide a speed control device for prime movers for watercraft which automatically reduces the engine speed upon the sudden removal of a load from the prime mover, more specifically a device which will reduce the speed of the prime mover to an idling speed when the propeller leaves the water during rough weather.

Briefly, I provide between the fuel feeding device or carbureter and the accelerator pedal or throttle lever for controlling the carbureter a two-part link mechanism normally locked together by a spring biased pivoted catch. This catch is in turn controlled by a governor which is connected to be driven from a speedometer cable driven by a front wheel or the driving shaft which drives the rear wheels of the motor vehicle or the propeller shaft of the boat, and disconnects the throttle lever under predetermined conditions, so that the carbureter can return to its biased minimum fuel feeding position to return the motor to idling speed. The engine, therefore, can be operated at any and all speeds desired so far as the motor vehicle is concerned so long as the vehicle itself is not travelling above the predetermined speed. In the case of the motor boat with the sudden increase in speed upon removal of the load when the propeller leaves the water, the catch on the two-part link is released so that the throttle of the carbureter is immediately returned to idling position, thus taking the driving force off the driving shaft and reducing either the speed of the motor and hence the speed of the driving shaft to the propeller.

The novel features which I believe to be characteristic of my invention are set forth with particularity in the appended claims, but the invention itself will best be understood by reference to the following description taken in connection with the accompanying drawing in which Figure 1 is a schematic diagram of a prime mover and a control therefor made in accordance with my invention, Figure 2 is a detailed view partly in section of a detail of my invention, and Figure 3 is a section taken along line 3—3 of Figure 2.

In the drawing the prime mover 10 shown in reduced scale is provided with a fuel feeding device or carbureter 11 having a throttle lever 12. Mounted within a casing 13 having a hinged front 13' which can be locked and which may be entered only by being unlocked, and which may be supported on the brackets 14 and 15 on the prime mover 10 is a speed control mechanism connected between the link mechanism 16 connected to the accelerator pedal, for example, or other means of manual control and the carbureter. This casing 13 has secured to its bottom a guide and support 17 in which is slidably mounted a two-part link comprising the parts 18 and 19, the carbureter being connected by the element 20 to the link part 18 and the element 21 connected to the accelerator pedal being connected to the link part 19. A biasing spring 22 normally holds the throttle 12 in the idling position and the biasing spring 23 urges both the link members 18 and 19 against the throttle towards the biased position. The links are normally maintained locked together by means of the catch 24 pivotally supported on the member 19 by pin 24' and engaging the link 18 in the depression 18'. This catch is maintained in locking position by means of a biasing apparatus carried by the link part 19. It comprises a pair of supports 25 and 26 on which are telescoped and slidably supported tubular members 27 and 28 supporting the bridging member 29 having a flat top surface. A spring 30 normally biases the bridging member 29 upwardly. This bridging member 29 is connected to catch 24 by link 31. Thus under normal conditions catch 24 is biased to the locking position. It will be observed that if the accelerator pedal is depressed the two-part link mechanism, catch and biasing apparatus will move to the right to open the throttle. So long as the biasing device remains in its uppermost position the two-part link acts as a solid link to control the carbureter. As shown in Figure 3 the guide support 17 is provided with an undercut slot in which the two-part link 18, 19 is slidably mounted, the supports 25 and 26 being secured to and moving with the link part 19.

In order to limit the speed of the vehicle I provide means for disengaging the two-part link mechanism. Within the casing 13 is mounted a governor 32, supported on bracket 33 and connected by means of cable 34 to, for example, be driven by the speedometer, the front wheels, the drive shaft or in the case of the prime mover for watercraft to the propeller shaft. In the present case the cable is coupled to the speedometer cable by means of a gear box 35, which is coupled between the conventional speedometer 36 and speedometer cable 37, the gear 38 being driven by speedometer cable and the gear 39 from the gear 38. The cable 37 may be connected to a wheel 37' or drive shaft of the vehicle or watercraft. Connected between the governor 32 and associated with the biasing device for controlling the catch 24 is a lever mechanism pivoted at 40. The upper part 41 is provided with a lower part or separate portion 42 carrying the roller 43. The member 44 provided with set screws 44' is threaded to receive the two parts 41 and 42 of the lever and may be rotated to increase or decrease the length of the lower portion of the lever. This permits the lower portion of the lever between pivot 40 and the biasing apparatus for the catch to be either lengthened or shortened to change the predetermined maximum speeds at which the device comes into operation to release the cable. Thus as the speed of the vehicle increases the governor balls move outwardly causing raising of the upper end of the lever to rotate it in a clockwise direction about the pivot 40, this being permitted by the slot and pin connection between the arm 41 and the governor 32. This depresses the bridging member 29 against biasing spring 30 and at the predetermined speed it will be depressed sufficiently to release catch 24 from link 18 permitting the link part 18 and carbureter throttle 12 to move to the biased position to immediately slow the motor 10 down to idling speed. To regain control the accelerator must be released so that the two-part link mechanism can be reengaged when the biasing spring 23 moves member 19 to the left against the member 18 of the link mechanism. Due to the roller and bridging arrangement the catch and its biasing device can move freely with the links 18 and 19 without being interfered with by the governor arrangement until the predetermined maximum speed is reached at which time the positive action of the governor releases the fuel feeding device from the control of the accelerator making it necessary to release the accelerator or other manual control to regain control of the motor.

In the case of water craft, cable 34 could be connected directly to the propeller shaft. In case of racing of the motor the governor acts immediately to release the two-part link so that the carbureter returns to idling position and the drive shaft and propeller slowed down. Thus sudden loads on the propeller and shaft are eliminated.

I thus provide a simple and effective speed governing device for controlling prime movers which may be used to limit the speed of travel of the vehicle but which at the same time does not interfere with normal operation of the prime mover for all speeds of the vehicle below the predetermined maximum speed of the vehicle. It is positive in operation and cannot be easily tampered with although it can be readily adjusted by qualified individuals for different maximum speeds. Due to its simplicity it can be easily adapted to existing prime movers and as pointed out it is suitable for use for prime movers for watercraft particularly when used in rough waters.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. In combination a prime mover, a fuel feeding device for said prime mover, a controller for said fuel feeding device and a control device for said prime mover and including a two-part link connected between the fuel feeding device and the controller, a connecting device pivotally carried by one part of said link for locking the parts of said link together, means for biasing said connecting device to a locking position, a speed responsive device and a pivoted lever adjustable in length and connected between said speed responsive device and said biasing means for releasing said connecting device to disconnect the two parts of said link when said speed responsive device reaches a predetermined speed.

2. In combination a prime mover, a fuel feeding device for said prime mover biased to minimum fuel feeding position, a controller for said fuel feeding device for operating it to another fuel feeding position, and a control device for said prime mover and including a support, a two-part link slidable in said support and connected between said fuel feeding device and said controller, a pivoted catch carried by one part of said two-part link for connecting the two parts of said link together, means for biasing said catch to connecting position, a speed responsive device operatively associated with said biasing means and operable against said biasing means to release said connecting catch whereby the fuel feeding device will return to a minimum fuel feeding position.

3. In combination a prime mover, a fuel feeding device for said prime mover, a controller for said fuel feeding device and a control device for said prime mover and including a two-part link connected between the fuel feeding device and the controller, a device carried by one part of said link for connecting the two parts of said link together, said connecting device being pivotally mounted on said one part of said link, means for biasing said connecting device to connecting position, a speed responsive device and means connected between said speed responsive device and said biasing device for releasing said connecting device, and a casing enclosing said control device and said speed responsive device.

4. A prime mover, a fuel feeding device for said prime mover biased to a minimum fuel feeding position, a control member for said fuel feeding device and a speed responsive device connected between said fuel feeding device and said control member and including a grooved support, a two-part link mechanism slidable in said groove, a catch for locking said parts together to cause them to move as a unit, a biasing device for retaining said catch in locked position and comprising means carried by one part of said two-part link and connected to said catch and provided with a flat surface parallel to said link, a speed governor and a pivoted lever connected to said speed governor and having one end operably associated with the flat surface of said biasing device whereby said biasing device and link may have relative movement with respect to said lever, said biasing device being free to move transversely of said link mechanism to actuate said catch.

5. A prime mover, a fuel feeding device for said prime mover biased to a minimum fuel feeding position, a control member for said fuel feeding device and a speed responsive device connected between said fuel feeding device and said control member, said speed responsive device comprising a two part link mechanism, a catch on one of said parts for locking said parts together for movement as a unit, a biasing device mounted on the catch carrying part of said link for retaining said catch in locking position, a speed governor, and means operatively associating said governor and said biasing device irrespective of the position of said part of said link which carries said catch and said biasing device to actuate said catch.

6. A prime mover, a fuel feeding device for said prime mover biased to a minimum fuel feeding position, a control member for said fuel feeding device and a speed responsive device connected between said fuel feeding device and said control member, said speed responsive device comprising a two part link mechanism connecting said fuel feeding device and said member, a catch for locking said parts together to cause them to move as a unit, a biasing device for retaining said catch in locked position and comprising means carried by one part of said two part link and connected to said catch and provided with connecting means adapted to move in a direction parallel to said link, a speed governor, and a pivoted lever connected to said speed governor and having one end operably associated with said connecting means of said biasing device whereby said biasing device and link may have relative movement with respect to said lever, said biasing device being free to move transversely of said link mechanism to actuate said catch.

WILSON L. MILLER.